Patented Aug. 13, 1935

2,010,844

UNITED STATES PATENT OFFICE 2,010,844

SEPARATION OF SILICA

John E. Bucher, Yellow Springs, Ohio, assignor to Antioch Industrial Institute, Inc., Yellow Springs, Ohio, a corporation of Ohio No Drawing. Application September 10, 1932, Serial No. 632,641

3 Claims. (Cl. 23—19)

This invention relates to the separation of beryllium from other elements, and particularly to the separation of beryllium from silicates.

In the commercial extraction of metals as salts from the natural silicate ores, it is common to "open up" or break the bond which holds the metals in firm combination with the silica, e. g., by heating or fusing them with suitable fluxes, such as carbonates, oxides, or hydroxides of alkaline or alkaline earth metals; and to break down the resulting silicate slags or glasses by acids which form salts with the metals, and set free silicic acid. This method has been used for more than fifty years for the separation of beryllium salts from beryl ores. As heretofore practiced, however, the method involves considerable difficulty because the silicic acid is set free in a form which is gelatinous, and to some extent soluble (or dispersible) in water. The silica in this form not only is difficult to remove from soluble salts, because of its solubility and very poor filtering qualities, but it also tends to hold within its gel structure a certain amount of the beryllium salts, and thereby to interfere with the complete recovery of the beryllium salts. As a consequence, it has heretofore been regarded as necessary to dehydrate the silica by evaporating water from the reaction mass to convert the silicic acid into a form in which it is amenable to filtration and washing.

I have now discovered that it is possible to eliminate the dehydration step by proper control of the reaction to precipitate the silica directly in a form which is adapted to be readily filtered, washed, or leached, etc., with little or none of the silica carried over into the solution of the beryllium salts.

It is common knowledge that when an acid reacts with another subtsance, the reaction will ordinarily take place more rapidly and completely if the acid be fairly dilute. A study of the art of separating beryllium from its ores prior to my invention indicates that this consideration has controlled, and that the reaction has been carried out in the presence of an excess of water. I have now discovered that by the simple expedient of limiting the amount of water present in the reaction, the formation of colloidal silica or soluble silicic acid can be substantially avoided, and particularly in the case where sulphuric acid is used to decompose the silicates, the heat of the reaction and the powerful dehydrating effect of the concentrated sulphuric acid may be utilized to dehydrate any silicic acid which may be formed.

After the action of the acid is so far complete that the silica is substantially all precipitated, water may be added in any amount, since the silica, having been once precipitated in insoluble form, will not then revert to the gel or soluble form.

As an example of how my process may be carried out, beryl opened up in a manner well known to the art may be treated as herein specified. A preferred method of opening up the ore is to crush the beryl, e. g., with a stone crusher, and then to grind it in a ball mill; e. g., to a fineness of about 100 mesh, and near the end of the grinding to add lime in the proportion of one part, by weight, of the lime to two parts, by weight, of beryl, and then to grind the two together until they are intimately mixed and the lime is thoroughly comminuted. The resulting material, either with or without briquetting, is then fused, e. g., in a reverberatory furnace heated, for example, to about 1400° C. to 1500° C. or higher and the molten material drawn off from the furnace. This slag or glass, after solidifying, may be crushed and/or ground, e. g., to 100 mesh, or finer, in which condition it will be suitable for the chemical separation treatment.

The essential condition of the treatment carried on according to my invention is that there shall be present, during the reaction, so little water that at an advanced stage in the reaction existence of gel to any serious extent will be avoided.

As a specific example of this method, the powdered slag produced as described above may be mixed cold with 66° Bé. sulphuric acid until a thick slurry is formed. The amount of sulphuric acid which is thus added may be slightly more than what is theoretically required for complete conversion of the slag into silica and sulphates. There is very slight reaction upon the initial mixing which raises the temperature only enough so that the reaction vessel will feel warm to the hand. This mixture may now be heated to 150° C., whereupon a vigorous reaction occurs, but the reaction does not go to completion. During this heating and the subsequent reaction throughout the process, I continually stir the reacting mass so as to prevent any tendency to set, due to the calcium sulfate or other compounds, formed during the reaction, which might tend to cake or set the mass. When the acid is first mixed with the dry powder in this way there is, however, much less tendency to cake than when water is added first and acid is mixed into the wet mass.

The reaction may be continued by further heating to a temperature at which the reaction will proceed substantially to completion, but I find it much more satisfactory to stimulate the reaction by adding to this mass from time to time small amounts of water. With each addition of water, the mass heats up, and boils or fumes violently until the water is completely taken up. Whenever the reaction begins to die down, a little more water is added, whereupon the action becomes violent again. This is repeated each time the reaction tends to die down, or preferably the water is added as a trickle or spray to maintain the reaction until the addition of further water does not renew the violent reaction. Thereafter the water can be added a little faster, without serious effects, and when the reaction is substantially complete, the mass is diluted sufficiently to avoid setting, and is preferably allowed to stand for several hours before being subjected to filtering, washing, leaching, etc.

It is not essential that the mass be allowed to stand in this way, and it may be filtered or otherwise separated immediately, but I have found that there is likely to be a certain amount of the beryllium compounds held by the insoluble products of the reaction which will go into solution upon standing, but is likely to be lost if the reaction products are separated immediately. Whether this final step is included in the process will depend upon economical considerations.

By proceeding in this manner, there will never be sufficient water present while silica is being released to allow formation of gel or soluble silica in any objectionable amount, and at the completion of the reaction, the silica will be present substantially entirely in an insoluble, granular form which is easily separated from the soluble salts, including beryllium, by filtration, leaching, or other suitable method.

It is an advantage of the process that the insoluble silica and gypsum if lime has been used as a flux, are produced in a granular form which quickly settles from a liquid, and which therefore is peculiarly adapted to counter-current washing or leaching, by which a thorough separation of the beryllium salts may be effected.

If the reaction mass is left without stirring and without dilution, it will set to a hard mass like gypsum plaster, which will then have to be broken up for best results in leaching.

If, at any time during the process, too much water is added, there may be a temporary formation of silica gel, but unless the amount of water is excessive, the gel will be formed only as a coating upon each particle, and will subsequently be dehydrated by the heat and the strong dehydrating action of the concentrated sulphuric acid, as the excess water is evaporated and taken up in the reaction. Even if such gel should not be completely dehydrated, the fact that it is in discrete particles will permit satisfactory separation, and I do not intend to be bound by any statement that there is no gel formed.

Carrying the above to its extreme, the entire amount of water which may be allowed during the reaction may be mixed with the powdered slag at the beginning of the reaction, and concentrated sulphuric acid may be added thereafter in small amounts. Any gel which is formed in the initial stages of this reaction will be dehydrated during the final stages. Proceeding in this way, I may for example, mix 60 parts, by weight, of the water which 100 parts of slag, and add to this mixture small amounts of concentrated sulphuric acid or preferably in a small stream or spray until the reaction is complete. The mass should be stirred during this reaction in the same way as in the case where concentrated acid is mixed with the dry powder. Any gel which may be formed during the initial stages of this reaction will be dehydrated, as already described, by the heat and action of the concentrated sulphuric acid during the later stages; and at the end of the reaction, the silica will be substantially entirely in granular form, although with this procedure there will be somewhat more silica carried over in soluble or colloid form into the solution than in the case where the concentrated acid is mixed with the dry powdered slag.

Although in the above examples I have referred to sulphuric acid, and although ordinarily I prefer to use sulphuric acid because of its low cost and because it is a powerful dehydrating agent, nevertheless, other acids may be used. For example, concentrated hydrochloric or nitric acid could be used, and, except for cost, organic acid could be used as well as mineral acids. Instead of using a concentrated aqueous solution of an acid, the powdered slag may be wet with a small amount of water, or water vapor, and may then be exposed to the anhydrous acid, as for example hydrochloric acid gas or fuming nitric or sulphuric acid, or to the acid anhydride, e. g., sulphur trioxide. Ordinarily, however, such expedients will involve an unnecessary increase in the cost of the process, and it will therefore be preferable to adopt a method substantially as described above.

What I claim is:

1. In the process of decomposing silicious beryllium compounds with formation of granular silica by combining the beryllium with an acid reagent adapted to form a soluble beryllium compound, the steps comprising mixing the reacting materials with insufficient water to permit the formation of a substantial amount of soluble or colloidal silicic acid, and adding water to the reacting material during the reaction so slowly that the formation of soluble or colloidal silicic acid is substantially prevented.

2. In the process of separating beryllium from silica with which it is chemically combined by reacting the beryllium silica compound with concentrated sulphuric acid, the steps comprising mixing the reacting materials without sufficient water to permit the formation of substantial amount of soluble or colloidal silicic acid and adding water during the reaction in an amount sufficient to stimulate the reaction, but at all times insufficient to form a massive gel.

3. In the process of separating beryllium from silica with which it is chemically combined, the steps comprising mixing with a compound thereof a concentrated acid and adding water to the mixture at a rate sufficient to increase the velocity of the reaction, but less than enough to permit the formation of massive silica gel.

JOHN E. BUCHER.

CERTIFICATE OF CORRECTION.

Patent No. 2,010,844. August 13, 1935.

JOHN E. BUCHER.

It is hereby certified that the the name of the assignee in the above numbered patent was erroneously described and specified as "Antioch Industrial Institute, Inc." whereas said name should have been described and specified as Antioch Industrial Research Institute, Inc., as shown by the records of assignments in this office; and that the said Letters Patent should be read with this correction therein that the same may conform to the record of the case in the Patent Office.

Signed and sealed this 17th day of September, A. D. 1935.

Leslie Frazer (Seal) Acting Commissioner of Patents.